US008453931B2

(12) United States Patent
Chiou et al.

(10) Patent No.: US 8,453,931 B2
(45) Date of Patent: Jun. 4, 2013

(54) BARCODE RECOGNITION METHOD AND COMPUTER READABLE MEDIUM

(75) Inventors: Hann-Huei Chiou, Taipei (TW); Pan-Lung Tsai, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 485 days.

(21) Appl. No.: 12/887,471

(22) Filed: Sep. 21, 2010

(65) Prior Publication Data
US 2011/0078620 A1 Mar. 31, 2011

(30) Foreign Application Priority Data

Sep. 25, 2009 (CN) .......................... 2009 1 0175756
Aug. 19, 2010 (CN) .......................... 2010 1 0262811

(51) Int. Cl.
*G06K 7/10* (2006.01)
(52) U.S. Cl.
USPC .................................................... 235/462.01
(58) Field of Classification Search
USPC ................................ 235/462.01, 375, 462.25
See application file for complete search history.

(56) References Cited

U.S. PATENT DOCUMENTS

2011/0036910 A1* 2/2011 Bremer et al. ........... 235/462.07

* cited by examiner

*Primary Examiner* — Edwyn Labaze

(57) ABSTRACT

A barcode recognition method is applicable to a data processing apparatus. According to the barcode recognition method, after the data processing apparatus is turned on, a control module loads and initializes a barcode recognition program from a data storage device, and then switches the barcode recognition program to background execution. The control module continuously monitors whether a trigger event occurs to the data processing apparatus. When the trigger event occurs, the control module switches the barcode recognition program to foreground execution. When the barcode recognition program is in foreground execution, an image capture module captures at least one image frame, for the control module to recognize. The control module derives barcode information, so as to obtain a recognition result. After the control module outputs the recognition result to other application programs by simulating keystrokes, the control module switches the barcode recognition program to background execution.

25 Claims, 4 Drawing Sheets

US 8,453,931 B2

BARCODE RECOGNITION METHOD AND COMPUTER READABLE MEDIUM

CROSS-REFERENCES TO RELATED APPLICATIONS

This non-provisional application claims priority under 35 U.S.C. §119(a) on Patent Applications No. 200910175756.9 filed in China on Sep. 25, 2009 and No. 201010262811.0 filed in China on Aug. 19, 2010, the entire contents of which are hereby incorporated by reference.

BACKGROUND OF THE INVENTION

1. Field of Invention

The present invention relates to a barcode recognition method, and more particularly to a barcode recognition method of directly outputting a recognition result to an application program by simulating keystrokes.

2. Related Art

In the prior art, there are two types of hardware for recognizing barcode. One is a barcode reader, which is dedicated to barcode recognition, connected to a terminal host. The terminal host supports one or more pre-determined barcode protocols. By using hardware architecture to perform image processing, binarization, and barcode comparison, the barcode reader transmits the barcode recognition result to the terminal host. The terminal host executes an application program, and receives and processes the barcode recognition result, so as to execute the function of the application program. The other type is a data processing apparatus equipped with an image capture module, for example, a desktop computer, a laptop computer, a personal digital assistant (PDA), a portable navigation device (PND) or a Smart Phone. The aforementioned data processing apparatus is not dedicated solely to barcode recognition. Through installing a barcode recognition program, the data processing apparatus can equipped with barcode recognition function.

Referring to FIG. 1, the process of performing barcode recognition by the data processing apparatus is to execute the barcode recognition program in foreground execution after loading and initializing the barcode recognition program (Step 1). The barcode recognition program is independent from other application programs. Therefore, a user needs a thread management program, such as a Task Manager program, to switch between the barcode recognition program and the other application programs.

After the barcode recognition program is launched, the data processing apparatus captures image frames through the image capture module. When capturing the image frames, the user has to confirm that the image capture module is aligned with the barcode through the display device at first, and then manually triggers the image capturing of barcode, such that the barcode recognition program obtains the image frame to be recognized. Alternatively, the user designates that the barcode recognition program loads an image file containing a barcode from the data storage device (Step 2). Next, the data processing apparatus starts to perform image processing, binarization, and comparison interpretation for deriving the barcode information (Step 3), and displays a recognition result on the display screen (Step 4).

As described above, the barcode recognition program is independent from other application programs. The user has to copy the recognition result in the barcode recognition program at first, switch between the barcode recognition program and the other application programs, and finally transfer the recognition result to other application programs through copy-and-paste operation. Such a copy-and-paste process is quite inconvenient to operate, particularly for handheld data processing apparatus like PDA, PND or Smart Phone, switching between different foreground programs is a difficult operation procedure. Alternatively, after storing the recognition result (Step 5), the recognition result in the internal database is transformed into a storage file, and then the storage file is exported to other application programs. Therefore, on the handheld data processing apparatus, the barcode recognition program simply has the barcode recognition function for the user to acquire the barcode information without further applications. When a large amount of barcodes are required be recognized, a software development kit provided by the barcode recognition system or an application program interface has to be used to call an external tool program to be integrated with the barcode recognition program, so as to enhance the use of the barcode recognition program for certain demands. However, the aforementioned method has a high cost and relatively high difficulty.

SUMMARY OF THE INVENTION

In the prior art, the data processing apparatus that executes a barcode recognition program cannot directly transfer the barcode recognition result to other application programs running in foreground, and thus the use of the barcode recognition program is limited. In order to solve the above problems, the present invention is directed to a barcode recognition method that is executed in a data processing apparatus and able to transmit the recognition result to other application programs.

The present invention provides a barcode recognition method applicable to a data processing apparatus, wherein the data processing apparatus at least comprises a control module, a touch-control display module, an image capture module, a data storage device, and an input unit. According to the barcode recognition method, after the data processing apparatus is turned on, the control module loads and initializes a barcode recognition program from a data storage device. And then the control module switches the barcode recognition program to background execution. The control module continuously monitors whether a trigger event to the data processing apparatus. When the trigger event occurs, the control module switches the barcode recognition program to foreground execution. When the barcode recognition program is in the foreground execution, the image capture module captures at least one image frame and transfers the captured image frame to the control module. The control module performs barcode recognition on the captured image frame, for determining a position of a barcode in the image frame and deriving the barcode information to obtain a recognition result. After outputting the recognition result to other application programs by simulating keystrokes, the control module switches the barcode recognition program to background execution.

The present invention further provides a computer readable medium, which stores a barcode recognition program for a data processing apparatus to read and execute to perform the following steps. The steps performed by the data processing apparatus comprises: loading and initializing a barcode recognition program; switching the barcode recognition program to background execution; continuously monitoring whether a trigger event to the data processing apparatus; switching the barcode recognition program to foreground execution when the trigger event occurs; capturing an image frame; recognizing the captured image frame for determining a position of a barcode in the image frame and deriving barcode information to obtain a recognition result; outputting the recognition result by simulating keystrokes; and switching the barcode recognition program to background execution.

The barcode recognition program is normally in background execution, so that the barcode recognition program does not monopolize system resources and does not interfere with operations of other application programs. At the same time, the recognition result of the barcode recognition program is output by simulating keystrokes, so that the recognition result can be directly output to a field where the information is input by the keyboard in other application programs. Therefore, the recognition result of the barcode recognition program can be directly output data to other application programs without integrating additional software, which reduces the difficulty and development costs of software writing and installation.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
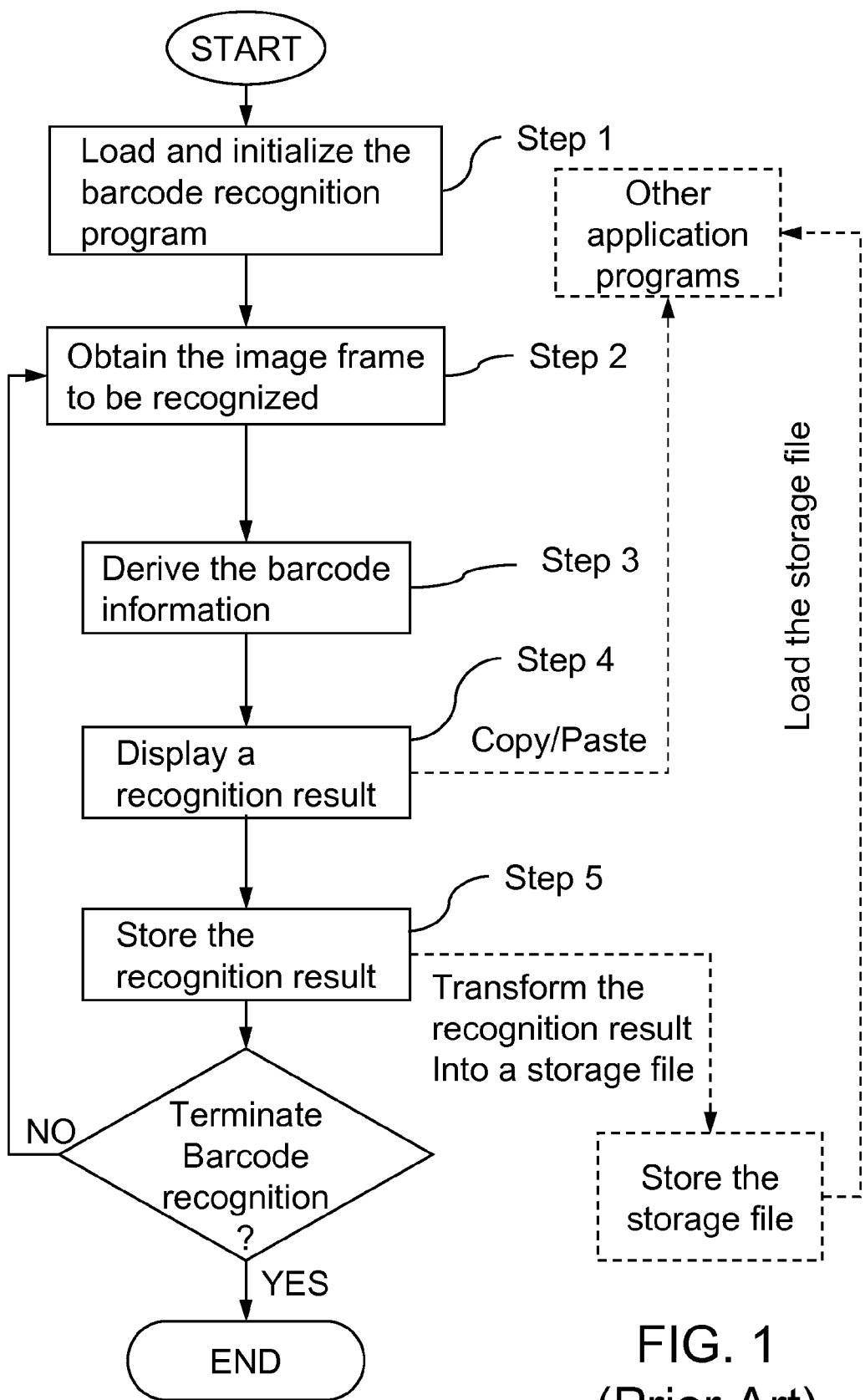
FIG. 1 is a flow chart of barcode recognition of a data processing apparatus in the prior art.
Figure 2:
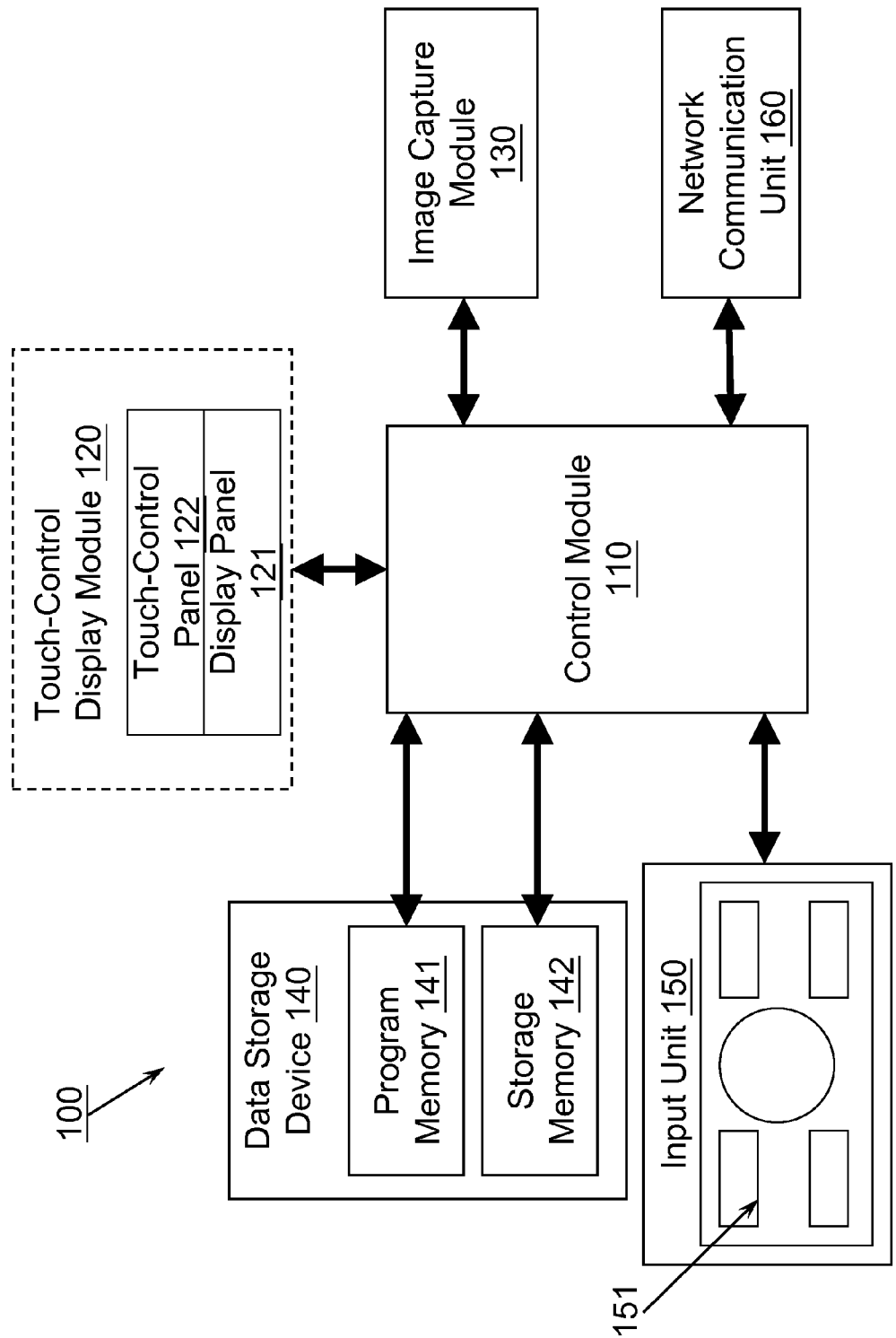
FIG. 2 is a system block diagram of a data processing apparatus according to an embodiment of the present invention.

Referring to FIG. 2, a data processing apparatus 100 according to an embodiment of the present invention is provided to perform a barcode recognition method of the present invention.

The data processing apparatus 100 may be a handheld data processing apparatus, for example, a PDA (personal digital assistant), a PND (portable navigation device) or a Smart Phone. And the data processing apparatus 100 is not limited to the handheld data processing apparatus, the data processing apparatus 100 may also be a desktop computer or a laptop computer. The data processing apparatus 100 at least comprises a control module 110, a touch-control display module 120, an image capture module 130, a data storage device 140, an input unit 150, and a network communication unit 160.

The control module 110 including a processor, a system logic chipset, and a display interface, and the control module 110 is provided for processing digital data. The processor and system logic chipset can be the combination of multiple electronic components independently disposed on a circuit board, or the processor and system logic chipset can be integrated into a system-on-a-chip (SoC). The control module 110 applied in the handheld data processing device is usually the SoC.

The touch control display module 120 receives the display signals sent by the control module 110 through the display interface to display an image frame, and the touch control display module 120 is touched to generate an operation signal corresponding to a specified area on the displayed image frame. The touch control display module 120 includes a display panel 121 and a touch-control panel 122 disposed on the display panel 141. The display panel 121 receives the display signal of the control module 110 to display the image frame, and the touch-control panel 122 is touched to generate a corresponding touch-control signal.

The image capture module 130 is electrically connected to the control module 110 for capturing an image frame and transmitting the image frame to the control module 110. The image capture module 130 is a cam/camera which utilizes a complementary metal oxide semiconductor (CMOS) or a charge coupled device (CCD), and is preferably a cam/camera having high resolution capability and an autofocus function for capturing images clearly.

The specification of the data storage device 140 varies according to different types of the data processing apparatus 100, and the data storage device 140 substantially includes a program memory 141 and a storage memory 142. The program memory 141 and the storage memory 142 can be two separated storage modules, or the program memory 141 and the storage memory 142 can be two partitions in a single storage module.

Taking the handheld data processing apparatus as an example, the program memory 141 is usually a random access memory for storing an operating system and important resident program, and serves as a space for the handheld data processing device to load and execute programs. The storage memory 142 is a built-in or external NAND Flash memory module for storing common data or non-resident general program files. The handheld data processing device is taken as an example in the embodiment of the present invention. If the data processing apparatus 100 is a common personal computer, the program memory 141 and the storage memory 142 can be respectively a system memory and a hard disk, and the operating system and important resident programs are installed and stored in the hard disk serving as the storage memory 142.

The input unit 150 is electrically connected to the control module 110 for generating an input instruction to the control module 110. The input unit 150 includes a plurality of keys 151 and each key 151 is designated with one or more input instructions. That is, after being triggered, each key 151 generates one or more corresponding input instructions. Each key 151 can be a single-direction key and a multi-direction key. The single-direction key can only be pressed in one direction to generate a single input instruction. The multi-direction key can be pressed in multiple directions and each direction corresponds to an input instruction.

The network communication unit 160 is connected to the control module 110 for connection to an external network. The network communication unit 160 can be a wireless communication module connected a wireless network. Or, the network communication unit 160 can be a USB port driven by an application software and be connected to a computer linked to a network, so as to be connected to the network by using the computer as a gateway. Or, the network communication unit 160 can be a wired network interface directly connected to a wired network.

Figure 3A:
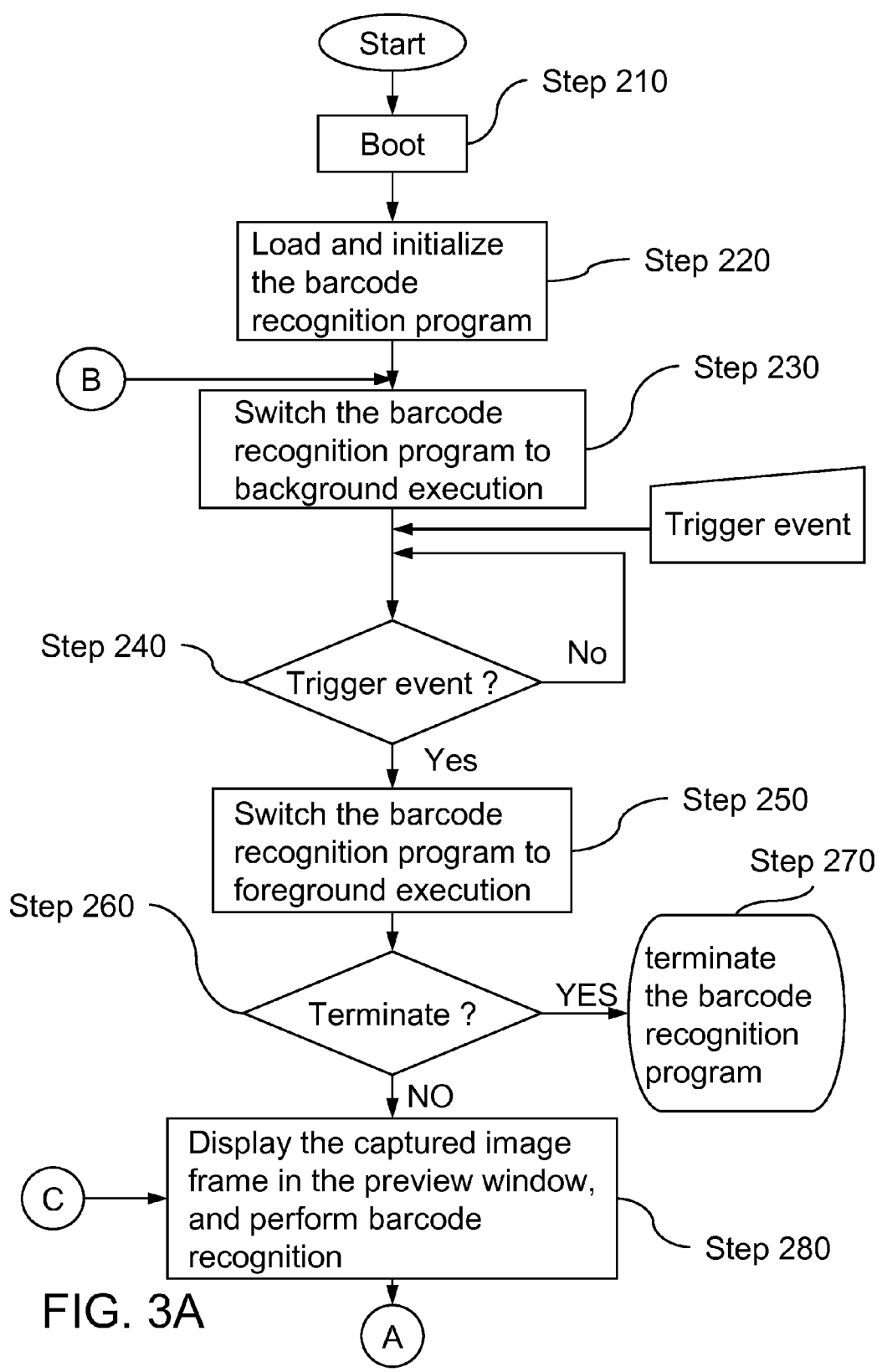
FIGS. 3A and 3B are flow charts of barcode recognition by a data processing apparatus according to an embodiment of the present invention.
Figure 3B:
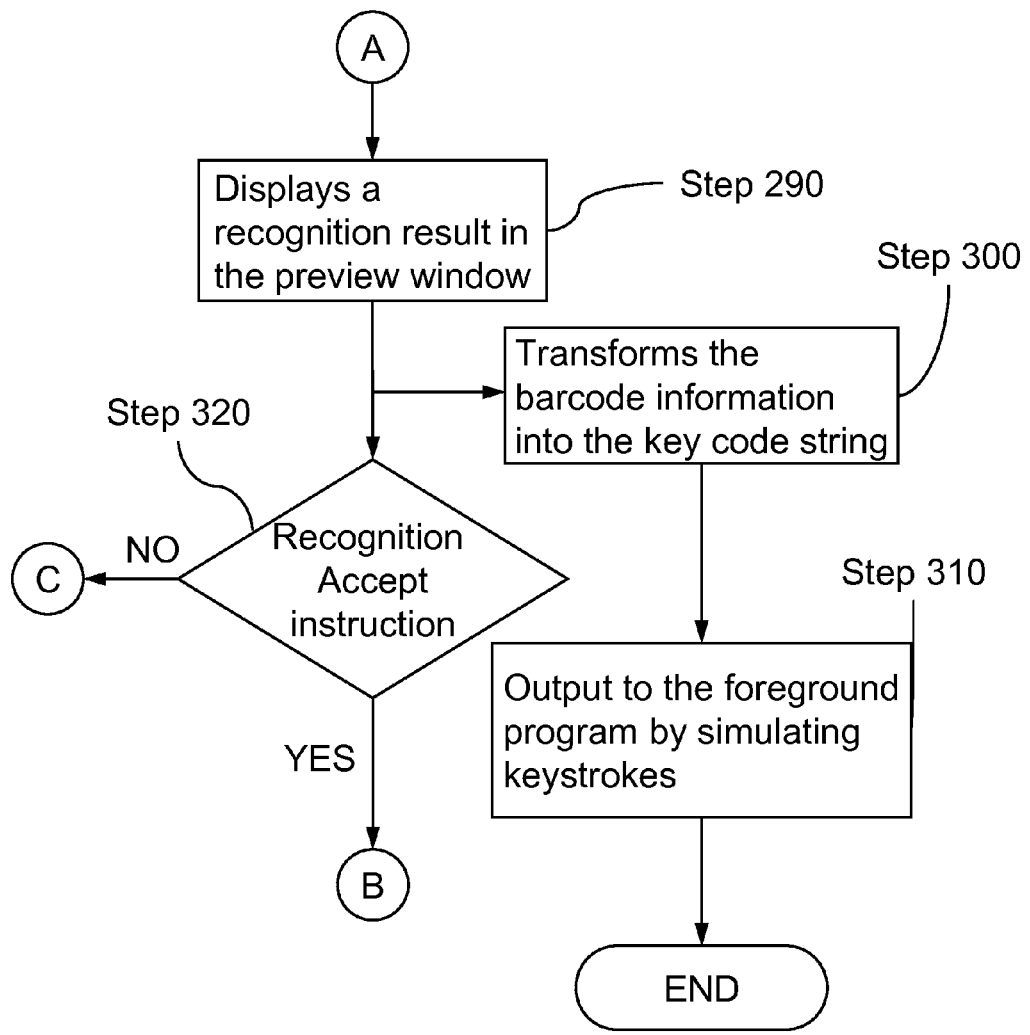

Referring to FIGS. 2, 3A, and 3B, in the data processing apparatus 100, an operating system is installed in the data storage device 140, for example, Microsoft (trademark) Windows CE, Microsoft (trademark) Windows Mobile, Embedded Linux or Android (trademark). Further, in the data processing apparatus 100, a barcode recognition program is installed in the data storage device 140. Before barcode recognition, the user manually operates the data processing apparatus 100 to load the barcode recognition program. Alternatively, through boot configuration of the data processing apparatus 100, the data processing apparatus 100 automatically loads the barcode recognition program when being booted.

After the data processing apparatus 100 is powered on or reset, the data processing apparatus 100 is booted (Step 210). By the manual operation of the data processing apparatus 100 or being automatically driven through the boot configuration of data processing apparatus 100, the control module 110 loads the operating system from a data storage device 140 and initializes the operating system after being booted. During the booting or after the booting is completed, the control module 110 of the data processing apparatus 100 loads and initializes the barcode recognition program from a data storage device 140 (Step 220).

The control module 110 switches the barcode recognition program to background execution thus turns to a standby state (Step 230). The user can continuously use other functions of the data processing apparatus 100, and the system resources of the data processing apparatus 100 will not be solely occupied by the barcode recognition program. Meanwhile, the barcode recognition program does not emit any instruction or data to interfere the operation of the application program in foreground execution.

The barcode recognition program includes a configuration file, and the configuration file records one or more trigger events, that is, at least a trigger event is assigned to the barcode recognition program.

By loading the configuration file to the cache of the control module 110 or the program memory 141, the control module 110 continuously monitors whether a trigger event occurs in the data processing apparatus 100 (Step 240).

If no trigger event occurs, the control module 110 continuously keeps the barcode recognition program in background execution. If the trigger event occurs, the barcode recognition program is then triggered, such that the control module 110 switches the barcode recognition program to the foreground execution (Step 250).

The trigger event can be a hardware signal transmitted to the control module 110.

For example, the hardware signal can be a touch-control signal generated by touching a specified area on the touch-control panel 122 of the touch-control display module 120. The display panel displays a user interface (UI) including plural execution icons. When an area on the touch-control panel 122 corresponding to an execution icon of enabling the barcode recognition program is touched, the touch-control panel 122 generates a touch-control signal which is transmitted to the control module 110.

Alternatively, one of the keys 151 of the input unit 150 is assigned to serve as the key 151 for triggering the barcode recognition program. When the key 151 generates the input signal to the control module 110, the input signal is the trigger event.

Next, the control module 110 executes every element of the barcode recognition program, in which this includes the executable file or dynamic linked library (DLL) in the barcode recognition program, and switches the barcode recognition program to foreground execution (S250). Meanwhile, by loading and executing a driver program, the control module 110 enables and controls the image capture module 130, so as to control the image capture module 130 to transmit the captured image frame to the control module 110. Simultaneously, the control module 110 generates an image signal to drive the display panel 121 of the touch-control display module 120 to display a preview window, and the captured image frame is displayed in the preview window.

Through the preview window, the user can align the image capture module 130 with the barcode to be recognized. The image frame captured by the image capture module 130 is transmitted to the control module 110, and the control module 110 transmits the capture image frame to the display panel 121, so as to display the image frame in the preview window. When the user previews the barcode in the window preview, the control module 110 simultaneously performs image frame capturing and caches the captured image frames in the program memory 141 or the storage memory 142 of the data storage device 140 for the control module 110 to recognize these captured image frames one by one.

The image capturing mode of the image capture module 130 is multiple frames capturing, the so-called multiple frames capturing is that the dynamic image capturing mode of the image capture module 130 is activated to perform continuous image capturing. The image capture module 130 is capable to capture 15 to 30 image frames per second. That is, image capture module 130 performs single image frame capturing 15 to 30 times per second and transmits the captured image frames to the control module 110, and then the control module 110 transmits the captured image frames to a cache buffer of the program memory 141 to be stored. The control module 110 also makes the continuously captured image frames be displayed in the preview window, for the user to confirm whether the image capture module 130 is aligned with the barcode to be recognized. Furthermore, in order to save the usage of the program memory 141, the control module 110 continuously deletes oldest captured image frame, and only the latest several captured image frames are kept.

By executing the barcode recognition program, the control module 110 continuously makes the captured image frame be displayed on the preview window of the display panel 121. And the control module 110 also caches the captured image frame in the program memory 141 or the storage memory 142 of the data storage device 140. Then the control module 110 performs barcode recognition on the latest captured image frame in the cache buffer of the program memory 141, so as to determine a position of a barcode in the captured image frame and derive barcode information. While the preview window is generated, the data processing apparatus 100 performs barcode recognition simultaneously. That is, it is not necessary to press the capturing button or other activate key by the user to activate operation of the barcode recognition.

When displaying the preview window, the control module 110 executing the barcode recognition program defines a program control area which is displayed around the preview window through the touch-control display module 120, for the user to confirm whether or not to interrupt the barcode recognition program (Step 260).

The program control area contains one or more button icons. The corresponding functions of the button icons include: a function of terminating the barcode recognition program (for example, (X) symbol on the upper left corner of the preview window), temporarily closing the preview window to return to the foreground program (the button block marked by OK).

When previewing the window, the user may touch the program control area of the touch-control display module 120 to interrupt the barcode recognition program, close the barcode recognition program, and temporarily terminate the barcode recognition work (Step 270).

If the user does not touch the touch-control display module to close the program or close the preview window, the control module 110 continuously executes the barcode recognition program and continues performing the barcode recognition work. The control module 110 repeats performing the barcode recognition in a loop-step, and automatically acquires the latest captured image frame from the cache buffer of the program memory 141, displays the captured image frame in the preview window, and performs barcode recognition (Step 280).

When performing barcode recognition, the control module 110 determines and searches for whether each of the captured image frames has the barcode area one by one. If a barcode exist in a captured image frame, the control module 110 determines a position of the barcode, derives barcode information, and displays a recognition result in the preview window (Step 290).

After the recognition result is shown, the barcode recognition program freezes the image displayed for a period of duration, such that the user may input the recognition accept instruction (Step 320). That is to say, the image displayed on the preview window stays at the latest captured image frame for performing the barcode recognition. The user can assign an image freezing duration in advance, and when the image freezing duration expires, a predetermined next step to be executed in the barcode recognition program is to auto-accept the recognition result or to auto-discard the recognition result.

If the predetermined next step to be executed is to auto-accept the recognition result the control module 110 outputs the recognition result after the image freezing duration expires.

If the predetermined next step to be executed is to auto-discard the recognition result, the user has to input the recognition result accept instruction within the image freezing duration (the recognition accept instruction is generated by the input unit 150 or the touch-control display module 120), such that after receives the recognition accept instruction, the control module 110 outputs the recognition result. In the situation that multiple barcodes appear in the preview window at the same time, the user can manually select one barcode through the input unit 150 or touch-control display module 120, to generate the recognition result accept instruction and output the corresponding recognition result.

In the step of outputting the recognition result, the control module 110 transforms the barcode information into the key code string according to the program codes of the barcode recognition program (Step 300). The barcode information is normally a string of numbers and English letters, so that the information can be directly transformed into the key code string. The control module 110 marks each key code of the key code string as an output of a keyboard and transmits an output of the keyboard to a foreground program in sequence, such that the barcode recognition result is output to the foreground program by simulating keystrokes (Step 310).

Since the barcode recognition result is output by simulating keystrokes, the recognition result can be directly transmitted to other application programs running in the foreground execution, for example, filling the barcode information into a certain field of the application program. For the application program, the barcode information is input like by using the keystrokes, so it is unnecessary to re-programming the application program or write an interface program to link the barcode recognition program and application program.

Steps 300 and 310 are also executed in the background and ended after the execution is completed. After the barcode recognition result is displayed, the control module 110 switches the barcode recognition program to background execution again (Step 230), so as to wait for input of a next trigger event.

Based on the aforementioned method, the present invention further provides a computer readable medium that stores a barcode recognition program for the data processing apparatus 100 to read and execute to perform the aforementioned method. After reading the computer readable medium, the data processing apparatus 100 executes the following steps: loading and initializing the barcode recognition program; switching the barcode recognition program to background execution; continuously monitoring whether a trigger event occurs in the data processing apparatus 100; when the trigger event occurs, switching the barcode recognition program to foreground execution; capturing an captured image frame; performing barcode recognition on the captured image frame to determine a position of a barcode in the captured image frame and derive barcode information to obtain a recognition result; outputting the recognition result by simulating keystrokes; and switching the barcode recognition program to background execution. The execution details of all steps are the same as those of the aforementioned methods and will not be repeated here again.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A barcode recognition method, applicable to a data processing apparatus, wherein the data processing apparatus at least comprises a control module, a touch-control display module, an image capture module, a data storage device, and an input unit, and the method includes the following steps:

loading and initializing a barcode recognition program from the data storage device by the control module;

switching the barcode recognition program to background execution by the control module;

continuously monitoring whether a trigger event occurs to the data processing apparatus by the control module;

when the trigger event occurs, switching the barcode recognition program to foreground execution by the control module;

capturing at least one image frame by the image capture module, and transmitting the captured image frame to the control module;

recognizing the captured image by the control module, so as to determine a position of a barcode in the image frame and derive barcode information to obtain a recognition result;

by the control module, outputting the recognition result by simulating keystrokes; and switching the barcode recognition program to background execution by the control module.

2. The method as claimed in claim 1, wherein the barcode recognition program comprises a configuration file and the configuration file contains the trigger event to be loaded by the control module.

3. The method as claimed in claim 1, wherein the trigger event is a hardware signal transmitted to the control module.

4. The method as claimed in claim 3, wherein the hardware signal is a touch-control signal generated by touching a specified area on the touch-control display module.

5. The method as claimed in claim 3, wherein the hardware signal is an input signal triggered by a key of the input unit.

6. The method as claimed in claim 1, wherein the step of capturing the image
frame by the image capture module further comprises:
generating an image signal by the control module, so as to drive the touch-control display module to display a preview window and display the captured image frame in the preview window.

7. The method as claimed in claim 6, wherein a program control area is displayed around the preview window when displaying the preview window.

8. The method as claimed in claim 7, wherein the program control area comprises one or more button icons for being touched to launch corresponding functions.

9. The method as claimed in claim 7, wherein the program control area at least comprises:
an icon button for being touched to terminating the barcode recognition program and;
an icon button for being touched to temporarily closing the preview window and switching the barcode recognition program to a foreground program.

10. The method as claimed in claim 6, wherein after the step of deriving barcode information, further comprising a step of displaying the recognition result in the preview window.

11. The method as claimed in claim 6, wherein the step for the control module outputting the recognition result by simulating the keystrokes is to output the recognition result after receiving a recognition accept instruction by the control module.

12. The method as claimed in claim 11, wherein the recognition accept instruction is generated by the input unit or the touch-control display module.

13. The method as claimed in claim 1, wherein the steps for the control module outputting the recognition result by simulating the keystrokes comprises:
transforming barcode information into a key code string by the control module; and
by the control module, marking each key code of the key code string as an output of a keyboard, and transmitting the output of the keyboard in sequence.

14. The method as claimed in claim 1, wherein the captured image is cached in the data storage device.

15. The method as claimed in claim 14, wherein an image capturing mode of the image capture module is multiple frames capturing, so as to obtain a plurality of image frames.

16. The method as claimed in claim 15, wherein the multiple frames capturing comprises the steps of: keeping the latest captured image frames in the data storage device by the control module, such that the control module loads the latest captured image frame of the static image frames from the data storage device for recognition.

17. A non-transitory computer readable medium, storing a barcode recognition program for a data processing apparatus to read and then executing following steps:
loading and initializing the barcode recognition program;
switching the barcode recognition program to background execution;
continuously monitoring whether a trigger event occurs to the data processing apparatus;
when the trigger event occurs, switching the barcode recognition program to foreground execution;
capturing an image frame;
recognizing the captured image frame, for determining a position of a barcode in the image frame and derive barcode information to obtain a recognition result;
outputting the recognition result by simulating keystrokes; and
switching the barcode recognition program to background execution.

18. The non-transitory computer readable medium as claimed in claim 17, wherein the barcode recognition program comprises a configuration file and the configuration file records the trigger event.

19. The non-transitory computer readable medium as claimed in claim 17, wherein the step of capturing the image frame further comprises:
displaying a preview window; and
display the captured image frame in the preview window.

20. The non-transitory computer readable medium as claimed in claim 19, wherein after displaying the preview window, further comprising a step of generating a dialog box to determine to close the barcode recognition program or continue execution of the barcode recognition program.

21. The non-transitory computer readable medium as claimed in claim 19, wherein after the step of deriving barcode information, further comprising a step of displaying the recognition result in the preview window.

22. The non-transitory computer readable medium as claimed in claim 17, wherein the step of outputting the recognition result by simulating the keystrokes is to output the recognition result after receiving a recognition accept instruction.

23. The non-transitory computer readable medium as claimed in claim 17, wherein the steps for outputting the recognition result by simulating the keystrokes comprises:
transforming barcode information into a key code string; and
marking each key code of the key code string as an output of a keyboard, and transmitting an output of the keyboard in sequence.

24. The non-transitory computer readable medium as claimed in claim 17, wherein the step of capturing the image frame is multiple frames capturing, so as to obtain a plurality of image frames.

25. The non-transitory computer readable medium as claimed in claim 24, wherein in the step of multiple frames capturing, a dynamic image capturing mode is used to obtain a plurality of static image frames and store the latest captured image frames, so as to load the latest captured image frame of the static image frames for recognition.

* * * * *